No. 874,878. PATENTED DEC. 24, 1907.
E. J. VRAALSTAD.
VEHICLE STEERING DEVICE.
APPLICATION FILED MAY 29, 1906.

2 SHEETS—SHEET 1.

Witnesses
Inventor
E. J. Vraalstad
Attorney

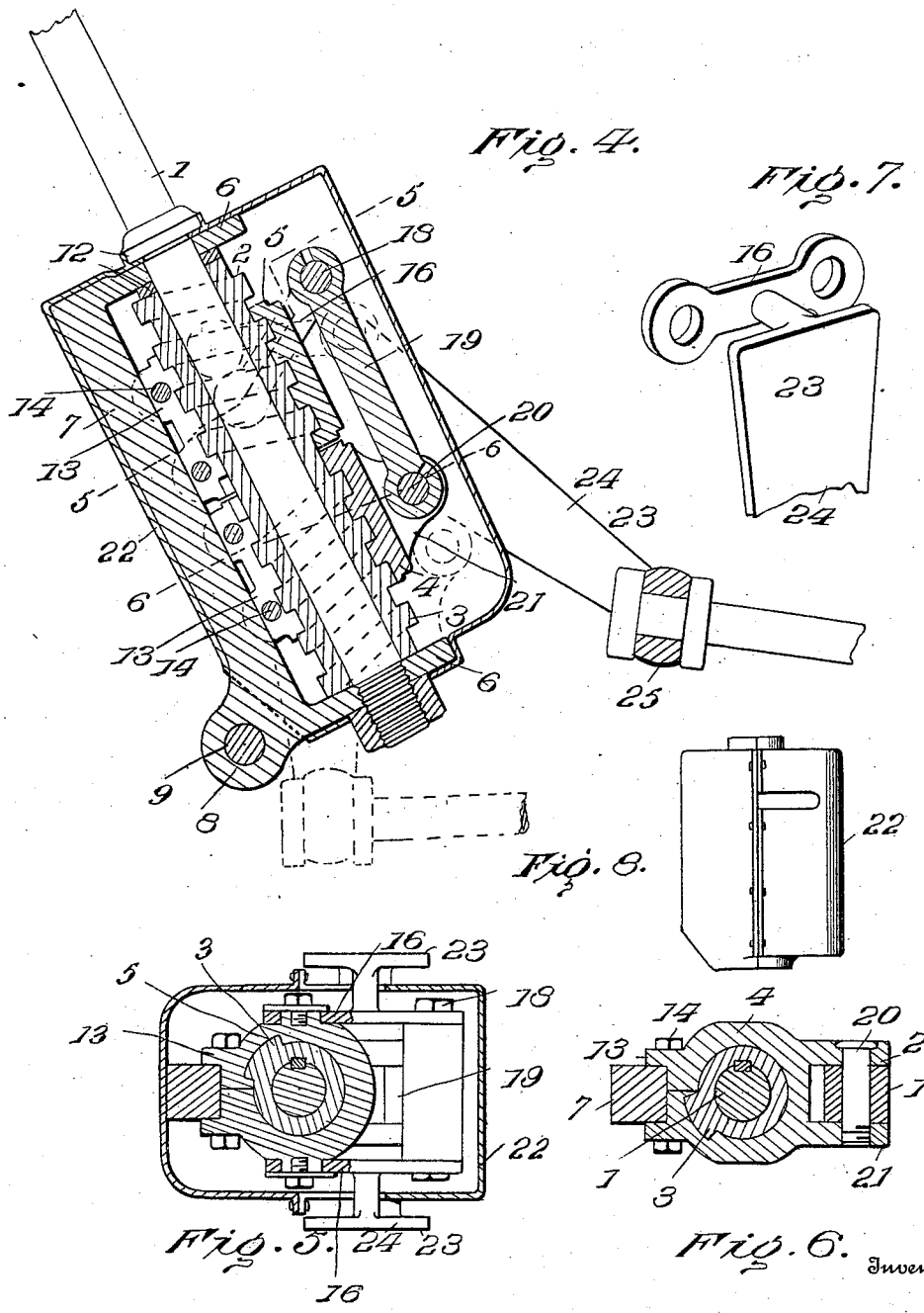

UNITED STATES PATENT OFFICE.

EDWARD J. VRAALSTAD, OF BUFFALO, NEW YORK.

VEHICLE STEERING DEVICE.

No. 874,878.  Specification of Letters Patent.  Patented Dec. 24, 1907.

Application filed May 29, 1906. Serial No. 319,367.

*To all whom it may concern:*

Be it known that I, EDWARD J. VRAALSTAD, of Buffalo, in the county of Erie and State of New York, have invented certain new and useful Improvements in Vehicle Steering Devices; and I do hereby declare the following to be a full, clear, and exact description of the invention, such as will enable others skilled in the art to which it appertains to make and use the same.

The object of this invention is to provide a steering device which, while capable of being readily manipulated by the operator, cannot be turned out of position by reason of either of the front wheels of a motor vehicle striking a stone or other projection.

A further object is to provide improved means for enabling the operating wheel and its rod to be thrown forward, out of the way, when the car is not in motion.

The invention will be hereinafter fully set forth and particularly pointed out in the claims.

Figure 1:
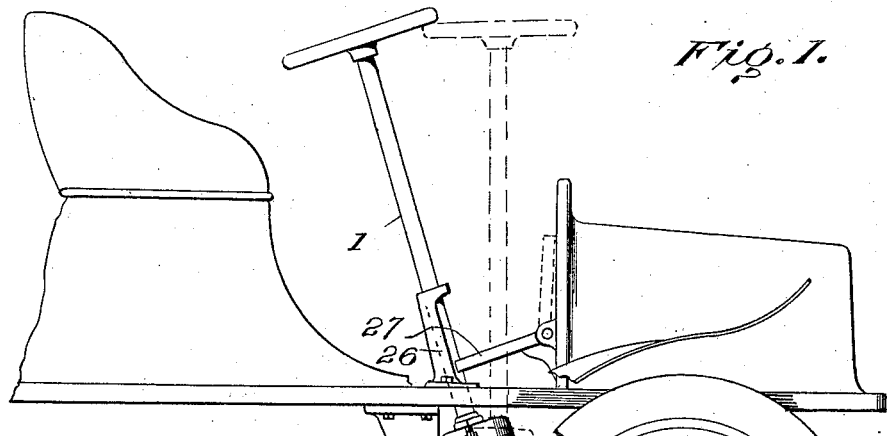
Figure 9:
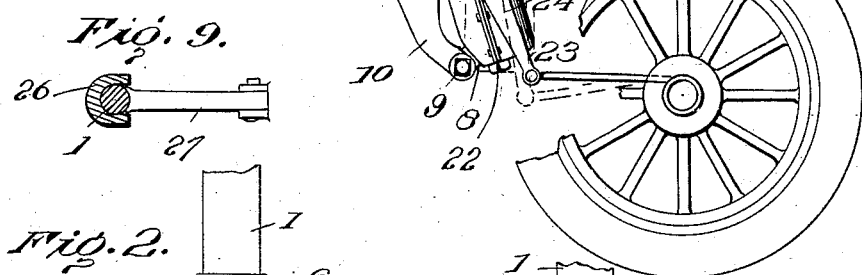
Figures 2, 3:
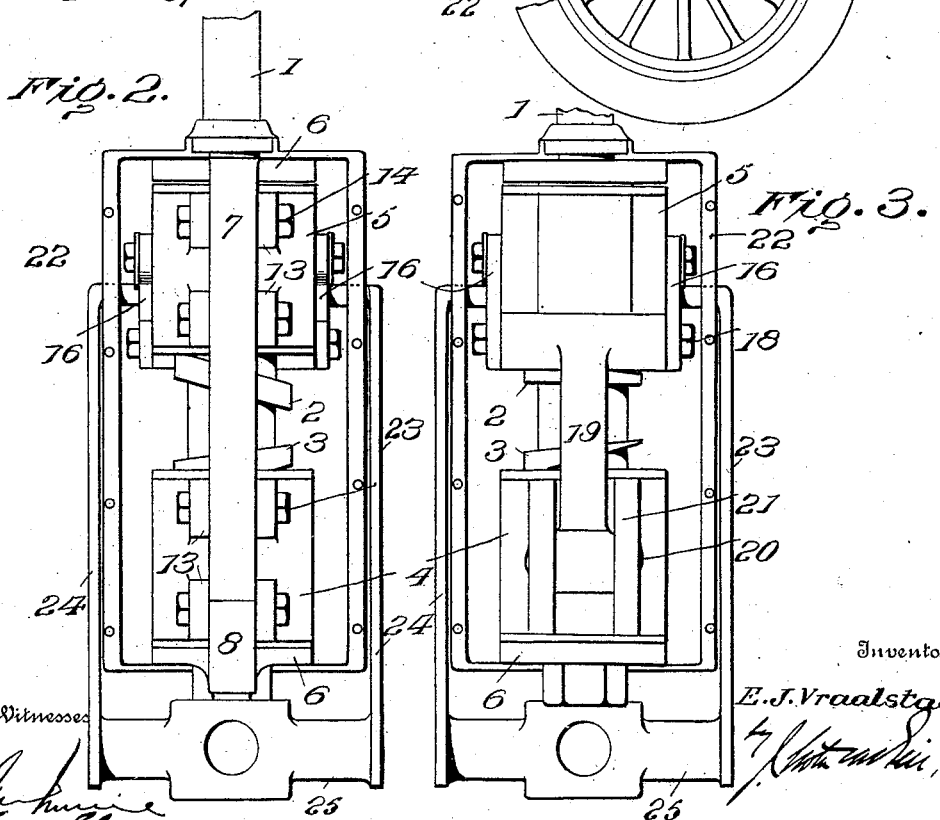

In the accompanying drawings, Figure 1 shows in side elevation a motor vehicle with my improvement applied. Figs. 2 and 3 are enlarged rear and front views. Fig. 4 is a longitudinal sectional view. Fig. 5 is a sectional view on line 5—5, Fig. 4.
Fig. 6 is a sectional view on line 6—6, Fig. 4, with the casing omitted. Fig. 7 is a detail. Fig. 8 is a side view of the casing. Fig. 9 is a sectional detail.

Referring to the drawings, 1 designates the steering rod which is equipped near its lower end with right and left screw threads 2 and 3, whereon work corresponding nuts 4 and 5. The rod projects through a frame composed of two corresponding end disks 6 and a connecting bar 7, which latter is formed at its lower end with an apertured lug 8, through which a bolt 9 is passed for securing it to a hanger 10 depending from the underside of the car, such bolt forming a pivot upon which the frame may be swung. The upper disk 6 is fitted between two collars 12, while the lower disk is engaged by the nut on the threaded end of the rod. The nuts 4 and 5 are guided by the bar 7, and for this purpose are formed with corresponding spaced apart ears 13, which ears may be apertured to receive the clamping bolts 14.

According to my invention a swinging member, connected at one end to the steering wheels of the vehicle, is, at its other end, secured direct to one of the two oppositely movable nuts, and is also articulated or flexibly connected to the other nut. It is not fulcrumed on any fixed bearing, but is supported wholly by the two movable nuts. This swinging member is shown as having at its upper ends arms or ears 16 pivotally connected, each at one end, to the upper nut 5, and at their other ends said arms or ears support a nutted bolt 18 for retaining a link 19 which is held by a bolt 20 between lugs 21 of nut 4. That portion of the rod carrying the mechanism for adjusting the swinging member is inclosed by a casing 22 having an opening at its lower end to accommodate the apertured lug 8. When this casing is employed it is necessary to form openings in the opposite walls thereof to accommodate the laterally-extended sides 24 of the swinging member 23, which sides have pivoted between them at their lower free ends a block 25 wherein is mounted the rod leading to one of the steering wheels.

By turning the steering rod the nuts will be caused to move toward or away from each other, and the swinging member being secured to one of the nuts and flexibly connected to the other, may be readily and easily shifted in either direction.

The opening in the floor through which the steering rod is passed is slightly elongated, and a portion of the rod above the floor is within a U-shape standard 26 wherein it is held by a pivoted bar 27 recessed in its free end to conform to the rod, whereby the latter will be held in the position required when the car is in motion. By disengaging this bar, the steering rod may be thrown forward, its frame turning on the pivot bolt 9. (See Fig. 1.) This allows of freedom of the operator in assuming or leaving the seat. To return the rod to its proper position it is only necessary to pull rearwardly thereon and then throw the bar into engagement therewith. This bar normally occupies an inclined position so that the accidental release of the rod is impossible.

The advantages of my invention will be manifest to those skilled in the art. By reason of the double thread and nut arrangement the danger of the vehicle being deflected by one of the steering wheels striking an obstruction is entirely obviated, and yet the swinging member may be readily and easily shifted by turning the steering rod.

It will also be noted that all the working parts are incased, save the swinging member, thus serving to protect the threads from injury by dirt or grit.

I claim as my invention:—

1. In a steering gear for vehicles, the combination with a steering rod, and a duplex screw-thread thereon, of two nuts, one for each thread, a swinging member carried wholly by said nuts and actuated by the movements thereof.

2. In a steering gear for vehicles, the combination with a steering rod, and a duplex screw-thread controlled thereby, of two nuts, one for each thread, a swinging member pivotally secured to one of said nuts, and a link pivotally secured to said swinging member and to the other of said nuts.

3. The combination with a rod having right and left hand screw threads, of nuts working on said threads, means for preventing said nuts from turning axially, a swinging member pivotally mounted on one of said nuts, and a link connecting said swinging member to the other of said nuts.

4. The combination with a rod having right and left hand screw-threads, and a guide bar parallel with the threaded portion of such rod, of nuts working on said threads and guided by said bar, a swinging member having arms connected to one of said nuts, and a link connecting said arms to the other of said nuts.

5. In a steering gear for vehicles, the combination with the rod having right and left hand screw-threads, of a frame through which such rod is passed, nuts working on said threads and guided by said frame, a casing inclosing all of said parts and the lower portion of said rod, said casing having openings in its sides, a swinging member comprising corresponding arms projected through said openings and secured to one of said nuts and connected to the other.

6. The combination with a rod having right and left hand screw-threads, and a guiding bar parallel with the threaded portion of such rod, of nuts working on said threads and guided by said bar, a swinging member having arms pivotally secured to one of said nuts, and a link pivoted to the other nut and to said arms.

7. The combination with a rod having right and left hand screw-threads, and a guiding bar parallel with the threaded portion of such rod, of nuts working on said threads and guided by said bar, one of said nuts having apertured lugs, a swinging member having arms pivoted to the other of said nuts, and a link pivotally secured at one end to said arms and at the other end to said lugs.

8. The combination with the rod, the frame thereon, and means within said frame, actuated by the rod, for effecting the shifting of the steering wheels of a vehicle, a fixed support, means for pivotally connecting said frame at its lower end to said fixed support, and means for holding said frame in its normal position.

9. The combination with the rod, the frame thereon, and means within said frame, actuated by the rod, for effecting the shifting of the steering wheels of a vehicle, a fixed support, and means for pivotally connecting said frame to said fixed support, of the U-shape standard through which the rod is passed, and means for retaining the rod in said standard.

10. The combination with the rod, the frame thereon, and means within said frame, actuated by the rod, for effecting the shifting of the steering wheels of a vehicle, a fixed support, and means for pivotally connecting said frame to said fixed support, of the U-shape standard through which the rod is passed, and a bar pivoted at one end and at its other end designed to engage and hold said rod within said standard.

11. The combination with the rod, the frame thereon having a pivoted support, and means actuated by the rod for effecting the shifting of the steering wheels of a vehicle, of the U-shape standard through which the rod is passed, and a bar pivoted at one end and at its other end designed to engage and hold said rod, said bar occupying an inclined position when in engagement with said rod.

In testimony whereof, I have signed this specification in the presence of two subscribing witnesses.

EDWARD J. VRAALSTAD.

Witnesses:
CHAS. J. CREIGHTON,
H. P. SEIPP.